(12) United States Patent  
Kang et al.

(10) Patent No.: US 8,124,267 B2
(45) Date of Patent: Feb. 28, 2012

(54) LITHIUM SECONDARY BATTERY HAVING PARTITIONED ELECTROLYTE

(76) Inventors: Bong Sup Kang, Seoul (KR); Young Ju Kang, Seoul (KR)

(*) Notice: Subject to any disclaimer, the term of this patent is extended or adjusted under 35 U.S.C. 154(b) by 760 days.

(21) Appl. No.: 12/067,016

(22) PCT Filed: Feb. 23, 2006

(86) PCT No.: PCT/KR2006/000617
§ 371 (c)(1),
(2), (4) Date: Mar. 14, 2008

(87) PCT Pub. No.: WO2007/032584
PCT Pub. Date: Mar. 22, 2007

(65) Prior Publication Data
US 2008/0226975 A1 Sep. 18, 2008

(30) Foreign Application Priority Data

Sep. 16, 2005 (KR) ........................ 10-2005-0086767

(51) Int. Cl.
*H01M 6/00* (2006.01)
*H01M 6/04* (2006.01)
*H01M 2/14* (2006.01)
*H01M 2/18* (2006.01)

(52) U.S. Cl. ........ 429/122; 429/126; 429/129; 429/142; 429/146

(58) Field of Classification Search .................. 429/126, 429/122, 129, 142, 146
See application file for complete search history.

(56) References Cited

U.S. PATENT DOCUMENTS

| 5,800,939 | A | 9/1998 | Mishina | |
| 6,372,387 | B1* | 4/2002 | Kawakami et al. | ........... 429/303 |
| 2004/0023106 | A1* | 2/2004 | Benson et al. | ................ 429/122 |
| 2005/0227132 | A1* | 10/2005 | Hori et al. | ...................... 429/30 |

FOREIGN PATENT DOCUMENTS

| JP | 59-181587 A | 10/1984 |
| JP | 10-294098 | 11/1998 |
| JP | 11-307124 | * 5/1999 |
| JP | 2001-015153 A | 1/2001 |
| JP | 2002-313422 A | 10/2001 |
| JP | 2001-351615 A | 12/2001 |
| JP | 2004-152596 A | 5/2004 |
| WO | 00/04601 A1 | 1/2000 |

OTHER PUBLICATIONS

International Search Report dated Jun. 19, 2006.

* cited by examiner

*Primary Examiner* — Helen O Conley
(74) *Attorney, Agent, or Firm* — Rothwell, Figg, Ernst & Manbeck, P.C.

(57) ABSTRACT

A lithium secondary battery is provided. Electrolytes of the lithium secondary battery are divided between an anode and a cathode into a plurality of regions not to contact with each other, thereby limiting movement paths of lithium ions. In this way, the lithium secondary battery inhibits growth of dendrite and improves energy density. Also, the lithium secondary battery that has a partition wall structure reduces leakage even when liquid electrolytes are used and actively copes with pressure applied to the battery.

13 Claims, 3 Drawing Sheets

[Fig. 1]
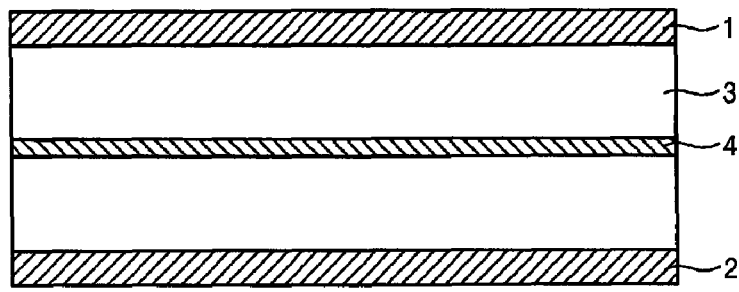
[Fig. 2]
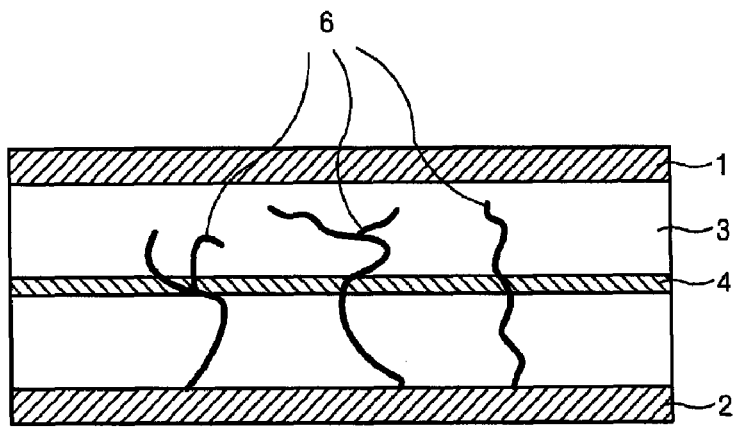
[Fig. 3]
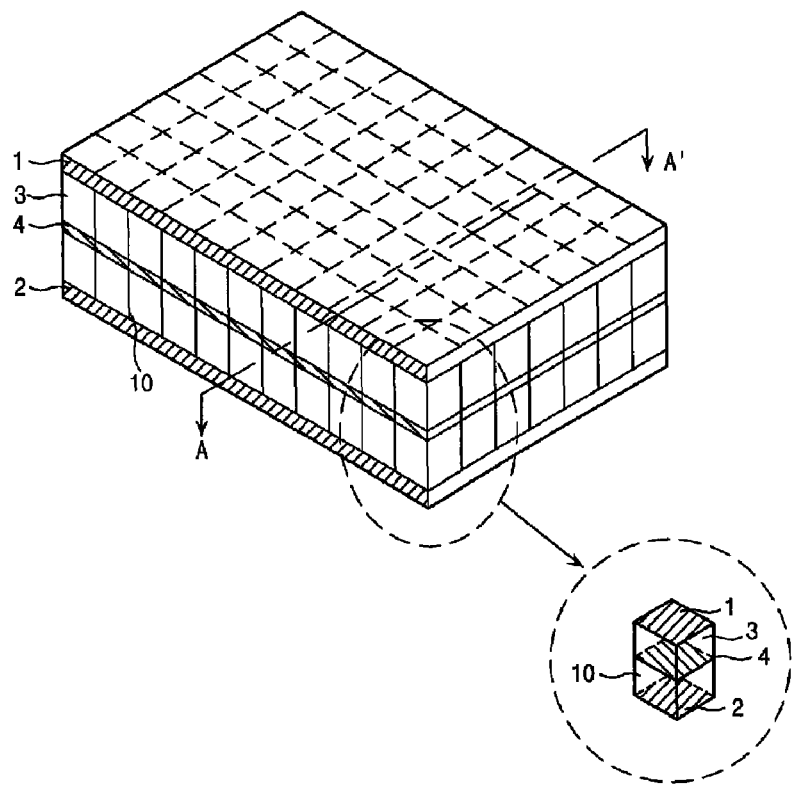

[Fig. 4]
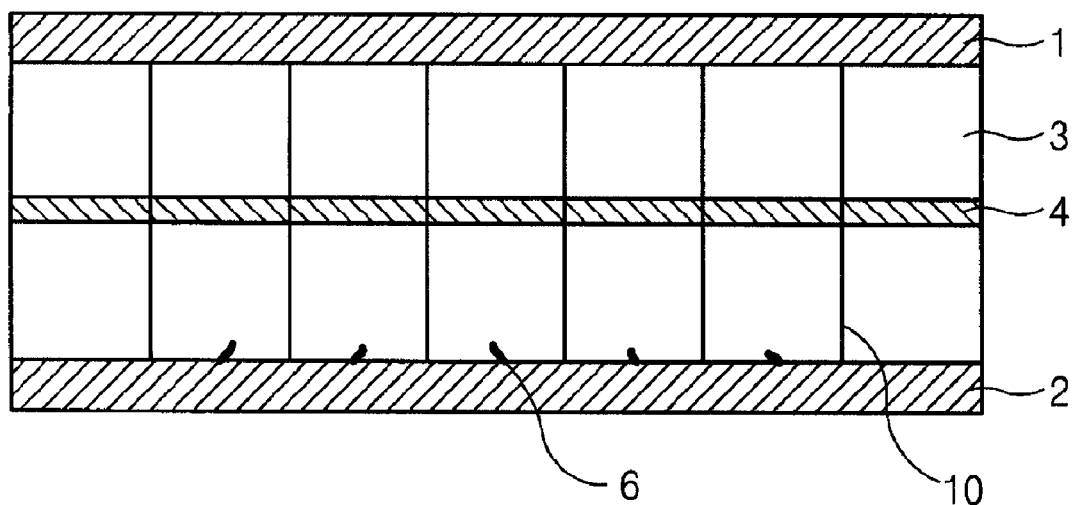
[Fig. 5]
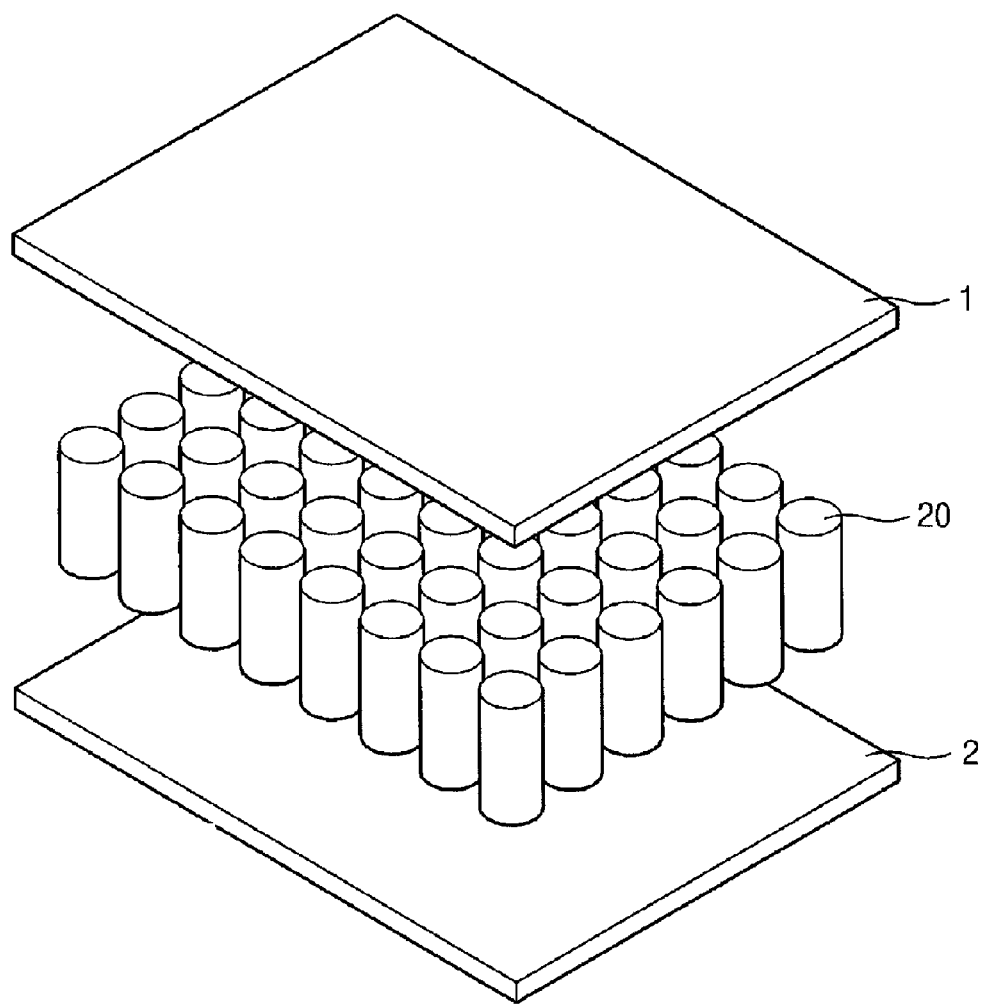

[Fig. 6]
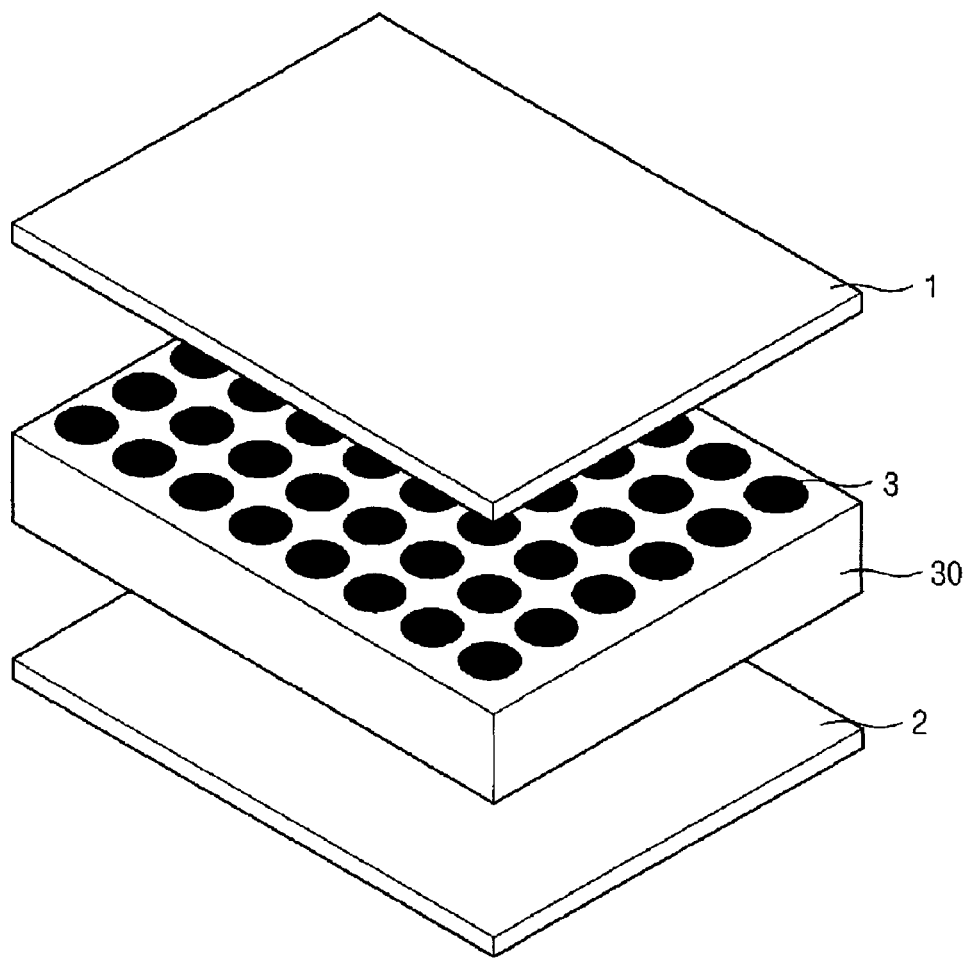
[Fig. 7]
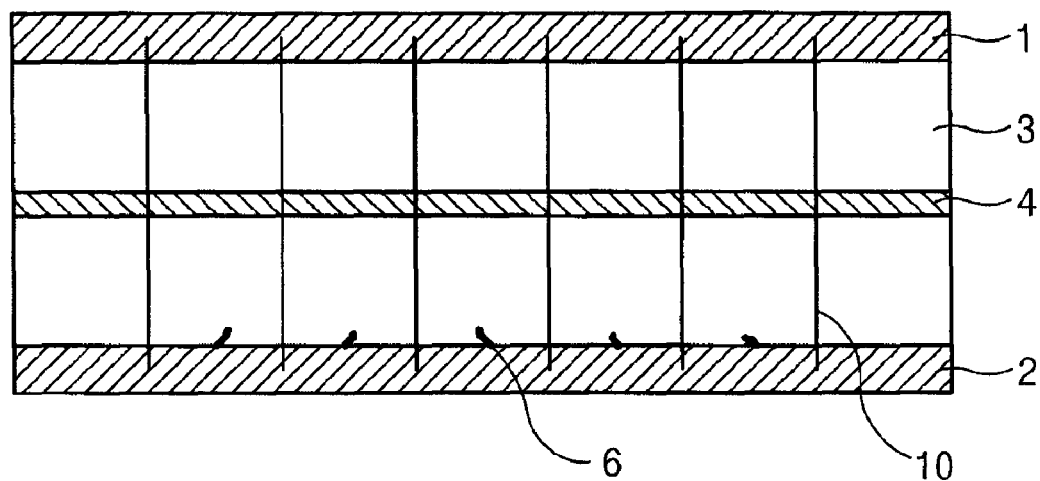

LITHIUM SECONDARY BATTERY HAVING PARTITIONED ELECTROLYTE

CROSS REFERENCE TO RELATED APPLICATIONS

This application is a 35 USC §371 National Phase Entry Application from PCT/KR2006/000617, filed Feb. 23, 2006, and designating the United States. This application claims priority under 35 U.S.C. §119 based on Korean Patent Application No. 10-2005-0086767 filed Sep. 16, 2005, which is incorporated herein in its entirety.

BACKGROUND OF THE INVENTION

1. Field of the Invention

The present invention generally relates to a lithium secondary battery, and more specifically, to a lithium secondary battery configured to divide electrolytes formed between electrodes of the lithium secondary battery into a plurality of regions to increase energy density, prevent degradation of stability due to growth of dendrite and improve cycle characteristics.

2. Description of the Related Art

Recently, interest on energy storage technology has been increased. In the energy storage technology, efforts of research and development of the energy storage technology have been specified as its application fields have been expanded into batteries for electric automobiles as well as portable electronic equipment An electric chemical device has been most noted in this aspect, and development of secondary batteries that can be charged and discharged has been focused. Due to development of smaller and lighter electric apparatus, smaller and lighter batteries used as a power source have been largely requested. As a result, in order to improve capacity density and non-energy of batteries, design of new electrodes and batteries has been recently researched and developed.

FIG. 1 is a diagram illustrating a structure illustrating a conventional lithium metal battery.

In the conventional lithium metal battery, an anode 1 and a cathode 2 are separated with polymer electrolytes 3 that enable movement of lithium ions so as to prevent a short of the electrodes 1 and 2. Also, in the conventional lithium metal battery, a separating film 4 is comprised between the anode 1 and the cathode 2 for smooth performance of electric generation reaction.

In the above-described conventional lithium metal battery, its energy density is about 3800 mAh/g. However, as charging is repeated in the lithium metal battery of FIG. 1, a dendrite 6 is generated as shown in FIG. 2 and stability is degraded due to reactivity between the dendrite 6 and electrolytes. For example, when lithium ions move continuously from the anode to the cathode while lithium is geometrically filled in an empty space of the crystal structure of the cathode 2 in excessive charging, the dendrite 6 is grown from the surface of the cathode 2 as shown in FIG. 2. If the dendrite 6 is continuously grown, it may perforate a separating film 4 and contact with the anode 1. In this case, the battery emits large energy explosively to cause fire. This phenomenon can be serious as the energy density of the lithium metal battery increases.

In order to overcome the above-described phenomenon, instead of metal lithium or its alloys, carbon materials using an absorption-emission process of lithium ions and matrix materials including conductive polymers have been recently developed for the cathode 2.

However, since a lithium ions secondary battery that uses carbon materials as the cathode does not employ lithium metals as the cathode, reaction between active lithium and electrolytes is not generated. Although the lithium ions secondary battery prevents a short between the electrodes 1 and 2 by dendrite, the lithium ions are doped between carbon layers so that capacity per gram is reduced corresponding to the amount of carbon. That is, when carbon materials is used as the cathode, the stability can be strengthened, but the theoretical energy density is remarkably decreased to about 370 mAh/g compared with the case the lithium metal is used.

Recently organic liquid electrolytes have been used as electrolytes. However, the liquid electrolytes may be leaked out of parts. Although a lithium polymer battery that uses solid electrolytes has been developed in order to prevent leakage of electrolytes, this lithium polymer battery does not solve the problem of dendrite while increasing of the energy density.

BRIEF DESCRIPTION OF THE DRAWINGS

Other aspects and advantages of the present invention will become apparent upon reading the following detailed description and upon reference to the drawings in which:

FIG. 1 is a diagram illustrating a structure illustrating a conventional lithium metal battery;

FIG. 2 is a diagram illustrating a dendrite generated in the conventional lithium metal battery;

FIG. 3 is a perspective view illustrating a first example of a lithium secondary battery according to an embodiment of the present invention;

FIG. 4 is a cross-sectional diagram illustrating a cross-section cut in an A-A' direction in FIG. 3;

FIG. 5 is an exploded perspective view illustrating a second example of a lithium secondary battery according to an embodiment of the present invention;

FIG. 6 is an exploded perspective view illustrating a third example of a lithium secondary battery according to an embodiment of the present invention; and FIG. 7 is a cross-sectional diagram illustrating a state where the length of a partition wall is extended into a secondary electrode according to an embodiment of the present invention.

DETAILED DESCRIPTION OF THE EXEMPLARY EMBODIMENTS

Technical Subject

Various embodiments of the present invention are directed at providing an improved lithium secondary battery to effectively prevent generation of dendrite and increase charging and discharging capacity.

Technical Solution

According to one embodiment of the present invention, a lithium secondary battery is configured to divide electrolytes of the battery into a plurality of regions individually.

Preferred Embodiments

The present invention will be described in detail with reference to the accompanying drawings.

FIG. 3 is a perspective view illustrating a first example of a lithium secondary battery according to an embodiment of the present invention, and FIG. 4 is a cross-sectional diagram illustrating a cross-section cut in an A-A' direction in FIG. 3. Whenever possible, the same reference numbers will be used throughout the drawings to refer to the same or like parts of FIGS. 1 and 2.

The lithium secondary battery of FIG. 3 includes electrolytes 3 divided in parallel into a plurality of regions individually between an anode 1 and a cathode 2. That is, the electrolytes 3 of the lithium secondary battery of FIG. 3 are divided and partitioned with a matrix type by partition walls 10.

Although the partition wall 10 is formed of polymer, ceramic and oxide, any materials that prevent penetration of lithium ions can be used for the partition wall 10.

An interval between the partition walls 10 is determined depending on that between electrodes 1 and 2 of the lithium secondary battery. That is, although it is more advantageous as the interval between the partition walls 10 becomes smaller, it is preferable that the interval is smaller than 1/5 of the interval between the anode 1 and the cathode 2. For example, the interval between the anode 1 and the cathode 2 of a general lithium polymer battery is 1 mm, the interval between the partition walls 10 is preferably less than 0.2 mm. However, the interval can be 1 mm to be the same as that of the electrodes 1 and 2. Of course, the interval between the partition walls 10 may be formed broader than that between the electrodes 1 and 2.

In order to manufacture these partition walls 10, a semiconductor manufacturing process including a CVD or an etching process may be applied. Otherwise, a photo-printing method can be performed on a predetermined portion where a partition wall is to be formed so as to change physical property of the portion, thereby forming the partition wall 10.

In the above-described lithium secondary battery according to an embodiment of the present invention, the electrolytes 3 are not connected to each other but separated into several regions by the partition walls 10, so that a plurality of batteries each having a rectangular pillar shape as shown in dotted lines of FIG. 3 are electrically connected in parallel. The partitioned electrolytes 3 share the anode 1 and the cathode 2. Of course, the shape of the partitioned electrolyte 3 is not limited to have a rectangular pillar type as shown in FIG. 3.

Although the dendrite is generated by various factors, the dendrite is generally generated because lithium ions do not move vertically. Therefore, the generation of dendrite can be reduced if the movement width of lithium ions is limited. That is, as shown in FIG. 3, if the electrolytes 3 are individually divided by the partition walls 10, the lithium ions can not penetrate through the partition walls 10, so that the movement path of the lithium ions is limited within each of the partitioned electrolyte regions. As a result, the movement path of the lithium ions does not deviate from the start location, thereby preventing growth of dendrite.

Since the growth of the dendrite 6 is inhibited although the dendrite 6 is grown in the cathode 2 of each lithium battery cell shown in FIG. 4, a short between the anode 1 and the cathode 2 due to the growth of the dendrite 6 can be prevented.

In this way, the cathode 2 may not be formed of carbon materials like in the prior art because the electrolytes 3 are divided into a plurality of regions in the lithium secondary battery according to an embodiment of the present invention. As a result, reduction of energy density which results from the use of cathode materials formed of carbon can be prevented.

For electrolytes in the embodiment of the present invention, either organic electrolytes or polymer electrolytes can be used. Even when liquid electrolytes are used for the electrolytes 3, the electrolytes 3 are adhered to the partition walls 10 by a capillary phenomenon and a surface tension because the electrolytes 3 are divided into fine partition walls, thereby reducing leakage.

Additionally, while the partition walls 10 are formed to partition only electrolytes in FIG. 4, the partition walls 10 are extended to infiltrate into a predetermined depth of the electrodes 1 and 2 in FIG. 7 as well as formed to partition electrolytes. As a result, it is possible to partition the electrolytes more precisely.

FIG. 5 is an exploded perspective view illustrating a second example of a lithium secondary battery according to an embodiment of the present invention.

In the embodiment of FIG. 5, a plurality of fine electrolyte pipes 20 coated with nonelectrolytes 30 are formed with a bundle type between the anode 1 and the cathode 2. While the partition walls 10 are formed to partition electrolytes in FIG. 3, a plurality of pipe-type electrolytes are prepared and the electrolyte pipes 20 are tied into a bundle between the anode 1 and the cathode 2 in the embodiment of FIG. 5. The electrolyte pipes 20 are coated with nonelectrolyte materials or nonelectrolyte materials are filled in a gap between the electrolyte pipes 20 so that the electrolyte pipes 20 do not directly contact with each other.

In the above-described lithium secondary battery according to an embodiment of the present invention, while the electrolytes 3 are divided into a plurality of regions, the anode 1, the cathode 2 and a separating film 4 are formed of one single electrode or film so as to be shared by the divided electrolytes. However, the electrodes 1, 2 and the separating film 4 may be divided corresponding to the shape of the divided electrolytes if necessary.

For example, as shown in dotted line circle of FIG. 3, the electrodes 1, 2 and the separating film 4 are divided corresponding to the shape (size) of each divided electrolyte so that each of the divided portions may be an individual small-sized lithium secondary battery (lithium battery cell). Then, these lithium battery cells are combined in parallel to form one large lithium secondary battery. While the electrolytes 3 of each lithium battery cell are enclosed with materials of the partition walls 10, the electrodes 1 and 2 are not enclosed with those of the partition walls 10. In other words, when lithium battery cells are combined in parallel, the electrolytes 3 do not directly contact with each other by materials of partition walls attached to side surfaces of each lithium battery cell while the electrodes 1 and 2 of a lithium battery cell electrically contact with the electrodes 1 and 2 of the adjacent lithium battery cell. The partition wall material may be formed to enclose both the electrolytes 3 and partial regions including other surfaces of the electrodes 1 and 2 that contact with the electrolytes.

In this way, when a secondary battery is formed with lithium battery cells, lithium battery cells are individually formed, and then a desired number of the cells are combined in parallel with a desired shape so that the size and the shape of the lithium secondary battery can be flexibly adjustable.

FIG. 6 is an exploded perspective view illustrating a third example of a lithium secondary battery according to an embodiment of the present invention.

In the embodiment of FIG. 6, a porous film 30 is formed between the anode 1 and the cathode 2, and the electrolytes 3 are absorbed in each hole of the porous film 30 to divide the electrolytes into a plurality of regions. That is, in order to divide the electrolytes 3, the electrolytes 3 are absorbed in holes of the porous film 30 in the embodiment of FIG. 6 so that each electrolyte 3 may be individually divided by the porous film.

In the above-described embodiments, the partition walls 10, nonelectrolyte materials and the porous film 30 are used in order to divide the electrolytes 3 so that a cross-section where the electrolytes 3 contact with the electrodes 1 and 2 may be reduced on the whole. However, since carbon is not used in cathode materials due to the structure according to the embodiment of the present invention, the energy density is remarkably increased (about over 10 times), compared with the case carbon is used. As a result, the charge capacity is rather increased.

Accordingly, the basic concept of the present invention is to partition electrolytes formed between the anode 1 and the cathode 2 in parallel with a fine segment structure. The partition method can be modified into various embodiments other than the above-described embodiments.

Industrial Applicability

As described above, a lithium secondary battery according to an embodiment of the present invention divides electrolytes into fine segments to inhibit growth of dendrite and improve energy density remarkably. Also, the lithium secondary battery reduces leakage even when liquid electrolytes instead of solid electrolytes are used for electrolyte materials so as to provide various selective chances. When compression is applied to the battery, the lithium secondary battery that has a partitioned electrolyte structure disperses the force and also is supported by partition walls so as to improve stability.

The invention claimed is:

1. A lithium secondary battery configured to divide electrolytes between a cathode and an anode into a plurality of electrolyte regions disposed between the cathode and the anode, wherein said electrolyte regions are divided by partition walls so the electrolyte regions cannot contact each other, wherein the anode and the cathode are electrically connected by the electrolyte regions and wherein each of the plurality of electrolyte regions is electrically isolated from other electrolyte regions by the partition walls.

2. The lithium secondary battery according to claim 1, wherein the plurality of electrolyte regions are divided by shape in a matrix.

3. The lithium secondary battery according to claim 1, wherein the partition walls are formed of materials which lithium ions cannot penetrate through.

4. The lithium secondary battery according to claim 1, wherein a distance between the partition walls is smaller than $\frac{1}{5}$ of an a distance between the anode and the cathode.

5. A lithium secondary battery comprising an anode extending in a direction parallel to a cathode, a plurality of electrolyte pipes arranged between the anode and the cathode, wherein said pipes extend in a direction perpendicular to the anode and the cathode, and have non-electrolyte coated surfaces, wherein the anode and the cathode are electrically connected by each of the electrolyte pipes, and wherein each of the plurality of electrolyte pipes is electrically isolated from other electrolyte pipes.

6. The lithium secondary battery according to claim 1, further comprising a porous film between the anode and the cathode, and the electrolytes are absorbed in holes of the porous film.

7. The lithium secondary battery according to claim 2, wherein the anode and the cathode are divided into anode and cathode pieces by partition walls, wherein each piece of the divided anode and the divided cathode has a size corresponding to the size of a divided electrolyte region contacting each of said divided anode and said divided cathode pieces, and wherein each of the divided anode and divided cathode pieces and the corresponding divided electrolyte region contact with each other electrically.

8. The lithium secondary battery according to claim 5, wherein the each of the electrolyte pipes includes a first end contacting the anode and a second end contacting the cathode.

9. The lithium secondary battery according to claim 6, wherein the porous film includes a first surface contacting the anode and a second surface contacting the cathode.

10. The lithium secondary battery according to claim 1, further comprising a separate film disposed between the cathode and anode.

11. The lithium secondary battery according to claim 1, wherein the plurality of electrolyte regions are rectangular-shaped or formed as rectangular pillars.

12. The lithium secondary battery according to claim 1, wherein the anode and the cathode extend in parallel to each other and the partition walls extend perpendicularly to the anode and the cathode.

13. The lithium secondary battery according to claim 1, wherein the partition walls are extended to infiltrate into a predetermined depth of the anode and the cathode.

* * * * *